(12) United States Patent
Boros et al.

(10) Patent No.: US 10,415,849 B2
(45) Date of Patent: Sep. 17, 2019

(54) DOWN-FIRED HIGH EFFICIENCY GAS-FIRED WATER HEATER

(71) Applicant: Rheem Manufacturing Company, Atlanta, GA (US)

(72) Inventors: Jozef Boros, Montgomery, AL (US); Qian Zhang, Montgomery, AL (US); Yoshiki Semba, Montgomery, AL (US); Subbramanian Thenappan, Montgomery, AL (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 0 days.

(21) Appl. No.: 15/638,929

(22) Filed: Jun. 30, 2017

(65) Prior Publication Data

US 2017/0299221 A1   Oct. 19, 2017

Related U.S. Application Data

(63) Continuation of application No. 13/942,343, filed on Jul. 15, 2013, now Pat. No. 9,714,774.
(Continued)

(51) Int. Cl.
*F24H 1/20* (2006.01)
*F24H 8/00* (2006.01)
(Continued)

(52) U.S. Cl.
CPC ........... *F24H 1/206* (2013.01); *F22B 21/348* (2013.01); *F24H 1/287* (2013.01); *F24H 8/006* (2013.01); *Y02B 30/106* (2013.01)

(58) Field of Classification Search
USPC ........................................................ 122/18.3
See application file for complete search history.

(56) References Cited

U.S. PATENT DOCUMENTS

| 1,933,056 A | 1/1930 | Hamilton |
| 1,935,632 A | 11/1933 | Handley |
| (Continued) | | |

FOREIGN PATENT DOCUMENTS

| EP | 0445413 | 9/1991 |

OTHER PUBLICATIONS

TIAX Brochure Sheet, Refined Heat Exchanger Design, Apr. 18, 2006, 1 page.

*Primary Examiner* — Steven B McAllister
*Assistant Examiner* — John E Bargero
(74) *Attorney, Agent, or Firm* — King & Spalding LLP

(57) ABSTRACT

A high efficiency downfired gas water heater is provided which has a tank for storing water to be heated, a combustion chamber extending downwardly through a top end of the tank, and a gas burner operative to create hot combustion products within the combustion chamber. At the bottom end of the tank is a transfer chamber coupled to an external discharge conduit and to a single pass heat exchanger, in the form of multiple flue tubes. extending vertically through the tank and connected to the combustion chamber. In one embodiment of the water heater the burner is a power burner which forces the combustion products sequentially through the combustion chamber, heat exchanger, transfer chamber and discharge conduit. In another embodiment of the water heater a draft inducer fan is used to draw the combustion products through this path from the combustion chamber.

20 Claims, 3 Drawing Sheets

Related U.S. Application Data

(60) Provisional application No. 61/692,082, filed on Aug. 22, 2012.

(51) Int. Cl.
 *F22B 21/34* (2006.01)
 *F24H 1/28* (2006.01)

(56) References Cited

U.S. PATENT DOCUMENTS

| | | |
|---|---|---|
| 4,160,440 A * | 7/1979 | Barnickle ............ F24H 9/2085 126/110 R |
| 4,163,430 A | 8/1979 | Neumann |
| 4,380,215 A | 4/1983 | Mendelson |
| 4,398,502 A | 8/1983 | Park |
| 4,492,185 A | 1/1985 | Kendall et al. |
| 4,541,410 A | 9/1985 | Jatana |
| 4,677,939 A | 7/1987 | Henault et al. |
| 4,768,116 A | 8/1988 | Watanabe |
| 5,022,352 A | 6/1991 | Osborne et al. |
| 5,179,914 A | 1/1993 | Moore, Jr. et al. |
| 5,195,502 A | 3/1993 | Hanning |
| 5,207,211 A | 5/1993 | Hanning et al. |
| 5,636,598 A | 6/1997 | Moore, Jr. |
| 5,666,943 A | 9/1997 | Adams |
| 5,666,944 A | 9/1997 | Ferguson |
| 5,699,756 A | 12/1997 | Ross et al. |
| 6,036,480 A | 3/2000 | Hughes et al. |
| 7,258,080 B2 | 8/2007 | Missoum et al. |
| 7,290,503 B2 | 11/2007 | Missoum et al. |
| 7,316,206 B2 | 1/2008 | Akkala et al. |
| 7,415,943 B2 | 8/2008 | Missoum et al. |
| 7,559,293 B2 | 7/2009 | Gordon et al. |
| 2003/0029441 A1 | 2/2003 | Dick |
| 2007/0051359 A1 | 3/2007 | Missoum et al. |
| 2007/0181081 A1 | 8/2007 | Missoum et al. |
| 2008/0216772 A1 | 9/2008 | Gordon |
| 2008/0223313 A1 | 9/2008 | Arnold et al. |
| 2009/0151653 A1 | 6/2009 | Mullen et al. |
| 2009/0165733 A1 | 7/2009 | Ferguson |
| 2009/0211540 A1 | 8/2009 | Yin et al. |
| 2009/0235875 A1 | 9/2009 | Gordon et al. |
| 2009/0301406 A1 | 12/2009 | Ritsema et al. |
| 2010/0043728 A1 | 2/2010 | Ma et al. |
| 2012/0080172 A1 | 4/2012 | Pacholski |

* cited by examiner

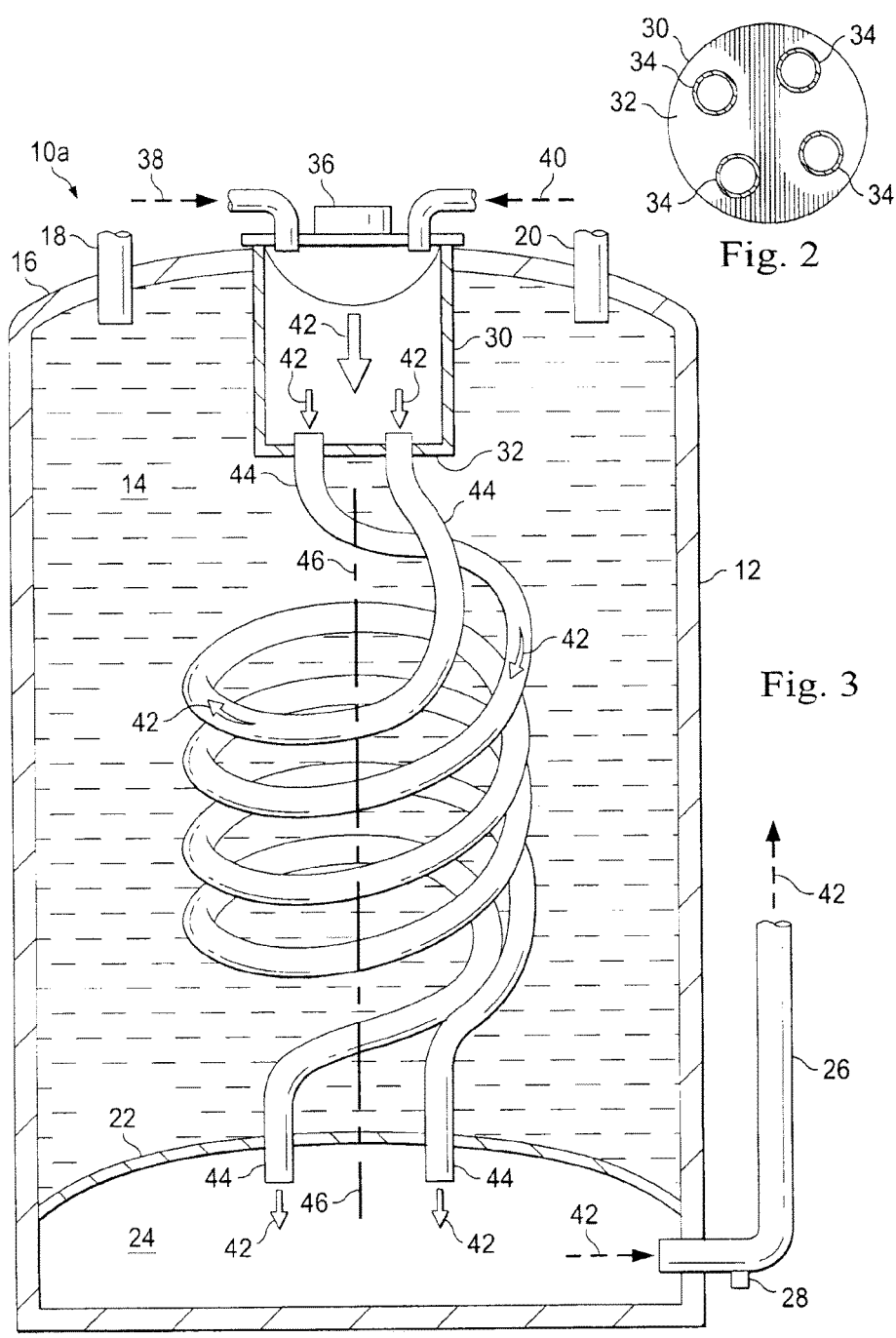

DOWN-FIRED HIGH EFFICIENCY GAS-FIRED WATER HEATER

CROSS-REFERENCE TO RELATED APPLICATION

The present application is a continuation application of and claims priority to U.S. patent application Ser. No. 13/942,343, titled "Downfired High Efficiency Gas-Fired Water Heater," and filed on Jul. 15, 2013, which claims the benefit of the filing date of provisional U.S. patent application No. 61/692,082 filed Aug. 22, 2012. The entire disclosure of each of the foregoing applications is hereby incorporated herein by this reference.

BACKGROUND OF THE INVENTION

The present invention generally relates to fuel-fired water heaters and, in representatively illustrated embodiments thereof provides a specially designed high efficiency down-fired gas water heater.

Fuel-fired storage type water heaters are commonly used in both commercial and residential applications to provide on-demand hot water to various types of hot water-utilizing plumbing fixtures such as sinks, showers, dishwashers and the like. In one conventional construction thereof, this type of water heater has a tank for holding pressurized water to be heated, a combustion chamber with a fuel burner therein for generating hot combustion products, and a flue extending through the tank interior. During firing of the water heater, hot combustion gases generated by the burner flow through the flue, with heat from the combustion gases being transferred from within the flue to stored tank water through which the flue extends.

With increasing demands for both higher energy efficiency and lowered water heater production costs, it has become necessary to design fuel-fired water heaters which are both simpler in structure and capable of transferring a greater percentage of burner-generated combustion heat to the stored tank water. It is to these design goals that the present invention is primarily directed.

BRIEF DESCRIPTION OF THE DRAWINGS

FIG. 2 is a cross-sectional view through a multi-tube flue portion of the water heater;

FIG. 3 is a schematic horizontally directed cross-sectional view through a first alternate embodiment of the water heater and FIG. 4 is a schematic horizontally directed cross-sectional view through a second alternate embodiment of the water heater.

DETAILED DESCRIPTION

Figure 1:
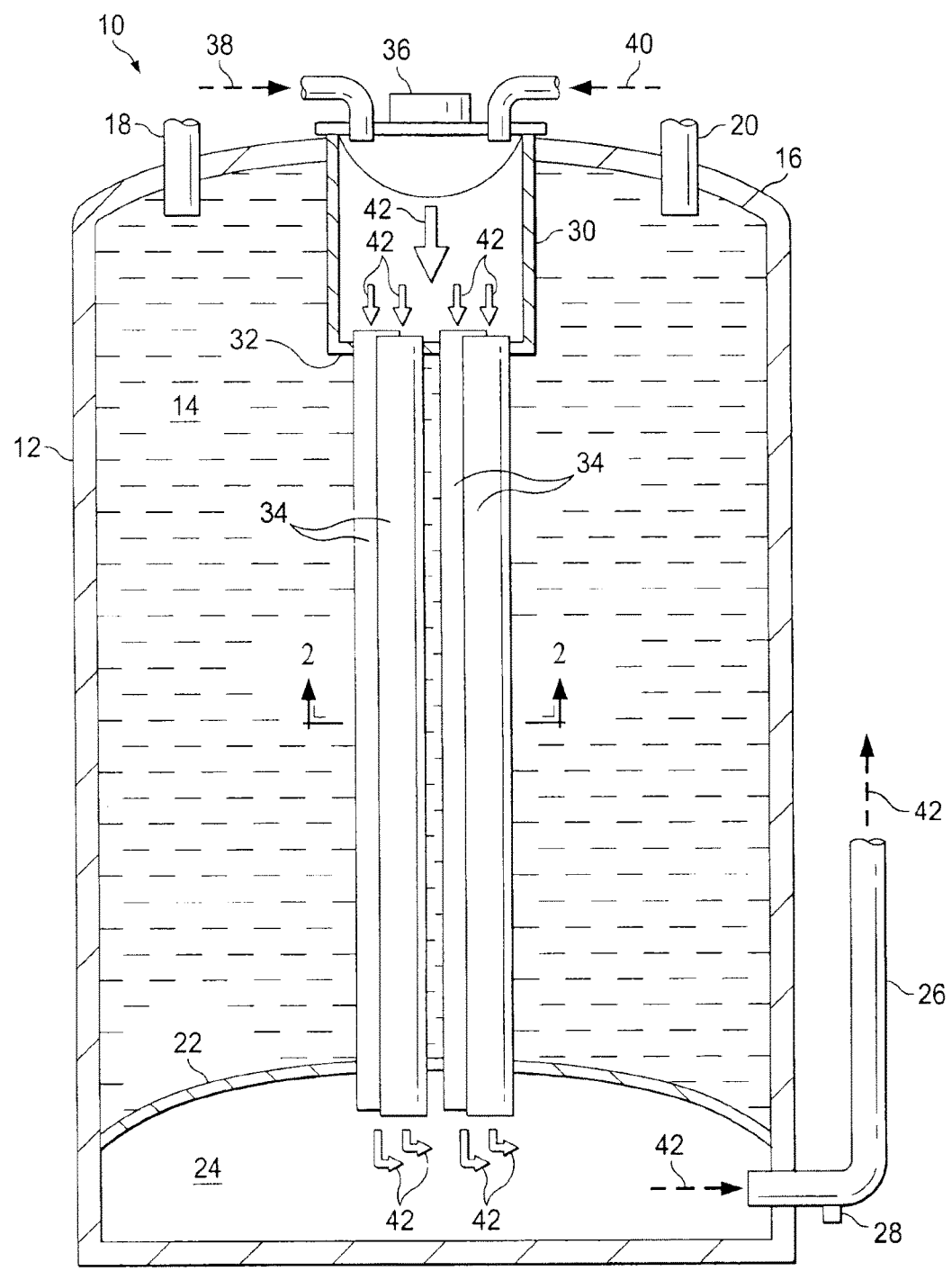
FIG. 1 is a schematic horizontally directed cross-sectional view through a downfired gas water heater embodying principles of the present invention.

Illustrated in FIGS. 1 and 2 is a downfired high efficiency gas-fired water heater 10 having a vertically oriented metal tank 12 adapted to hold a quantity of pressurized water 14 for on-demand delivery to hot water-utilizing plumbing fixtures such as, for example, sinks, tubs, showers, dishwashers and the like. Tank 12 has a top end wall 16 with a cold water inlet fitting 18 and a hot water outlet fitting 20 thereon, and a bottom end wall 22 that overlies a combustion products transfer chamber 24 with which a discharge conduit 26 with a condensate drain fitting 28 on its bottom end communicates.

A submerged tubular combustion chamber structure 30 having a bottom end wall 32 and an open top end, extends downwardly through a central portion of the top tank end wall 16. The upper ends of a plurality of vertical, open-ended flue pipes 34 (representatively four in number) are secured to the combustion chamber bottom end wall 32, with each of the flue pipes 34 intercommunicating the interiors of the combustion chamber 30 and the combustion products transfer chamber 24.

Received in the upper end of the combustion chamber 30 is a powered fuel burner 36 operative to receive fuel 38 and air 40 from sources thereof and responsively create within the combustion chamber 30 hot combustion products 42. During firing of the burner 36, the hot combustion products 42 are sequentially forced downwardly through the flue pipes 34 to transfer combustion heat therethrough to the water 14, into the combustion products transfer chamber 24, and then outwardly into and upwardly through the discharge conduit 26. Preferably, the pipes 34 define a condensing type heat exchanger, with the resulting condensate being drainable from the system via the fitting 28.

An alternate embodiment 10a of the previously described water heater 10 is shown in FIG. 3, with components in the water heater 10a similar to those in the water heater 10 having been given the same reference numerals to facilitate comparison of the water heaters 10 and 10a.

Water heater 10a is identical to the previously described water heater 10 with the exception that in place of the straight flue pipes 34 utilized in water heater 10, the water heater 10a is provided with a plurality of flue pipes 44 (representatively two in number) which are connected to the bottom end 32 of the submerged combustion chamber 30 and downwardly coil around the central vertical axis 46. Pipes 44, like the pipes 34 in the water heater 10, intercommunicate the interiors of the combustion chamber 30 and combustion products transfer chamber 24. During firing of the burner 36 of the water heater 10a, the hot combustion products 42 are sequentially forced downwardly through the pipes 42 into the chamber 24, and then outwardly from the chamber 24 into the discharge conduit 26.

Figure 4:
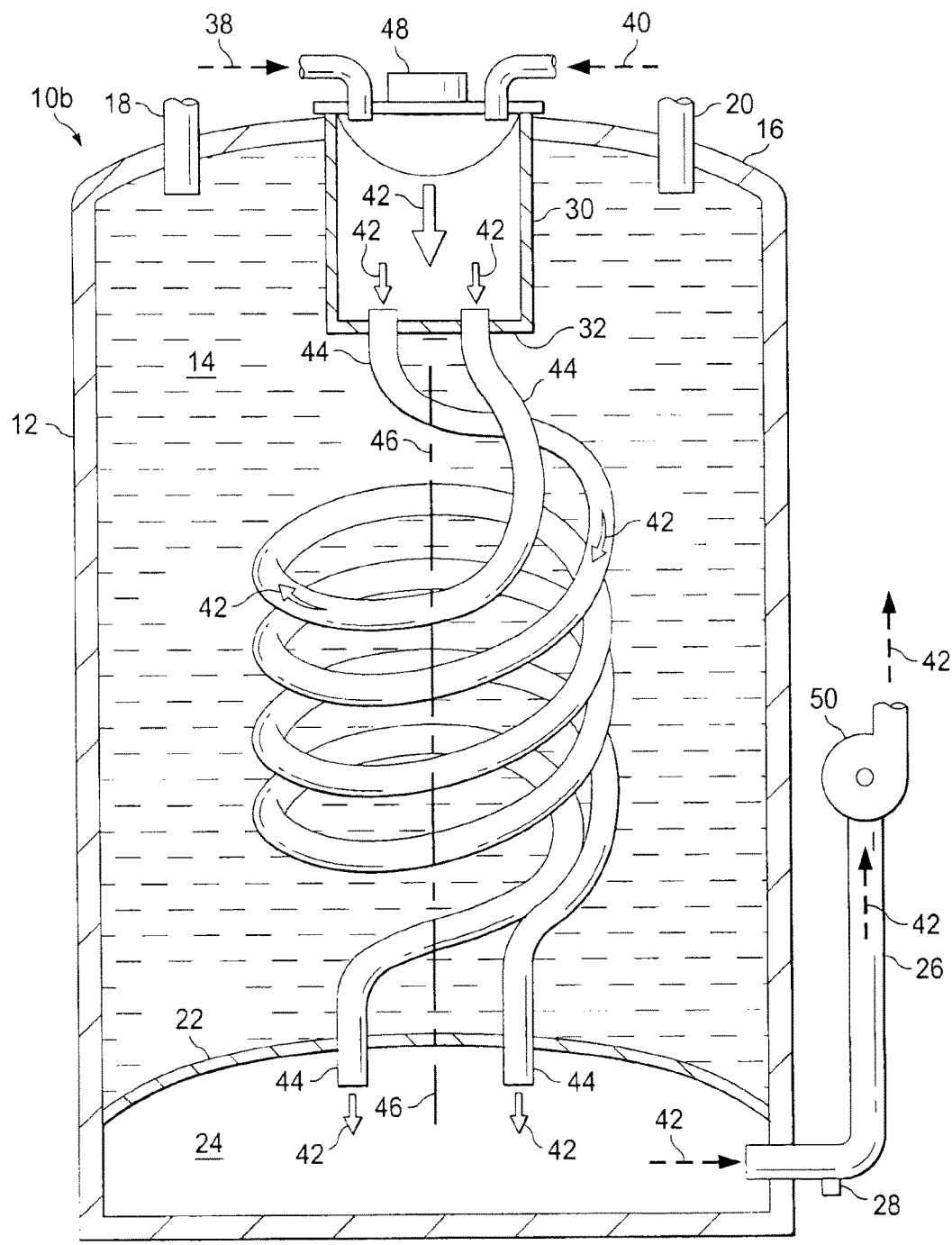

An alternate embodiment 10b of the previously described water heater 10a is shown in FIG. 4, with components in the water heater 10b similar to those in the water heater 10a having been given the same reference numerals to facilitate comparison of the water heaters 10b and 10a.

In the water heater 10b the hot combustion products 42 generated by the fuel burner 48 are not sequentially forced by the burner 48 downwardly through the combustion chamber 30, downwardly through the flue pipes 44 into the combustion products transfer chamber 24 and then outwardly into the discharge conduit 26. Instead, an induced draft blower 50 installed in the discharge conduit 26 sequentially draws the hot combustion products 42 downwardly through the combustion chamber 30, downwardly through the flue pipes 44 into the combustion products transfer chamber 24, and then outwardly into and upwardly through the discharge conduit.

During operation thereof, the induced draft blower 50 maintains negative pressures in the combustion chamber 30 and in the combustion products transfer chamber 24. thereby providing the combustion system of the water heater 10b with a "draw-through" mode of operation. While this alternate mode of combustion system operation has been representatively illustrated in conjunction with the coiled flue pipes 44 (shown in FIGS. 3 and 4) is could also be utilized in conjunction with the straight flue pipes 34 (shown in FIG. 1), if desired, without departing from principles of the present invention.

As can be seen from the foregoing, the single pass heat exchanger structure in each of the representatively illustrated downfired water heater embodiments 10-10b is of a very simple construction and provides for enhanced heat transfer from the burner-generated hot combustion products 42 to the tank water 14. In turn, this desirably reduces the temperature of the combustion products 42 entering the discharge conduit 26 and increases the overall heating efficiency of the associated water heater.

The foregoing detailed description is to be clearly understood as being given by way of illustration and example only, the spirit and scope of the present invention being limited solely by the appended claims.

We claim:

1. A fuel-fired liquid heating apparatus comprising:
   a tank adapted to hold a quantity of liquid to be heated, the tank having an upper wall and a lower wall;
   a combustion products transfer chamber structure disposed outside and below the tank such that the lower wall of the tank defines a top end of the combustion products transfer chamber structure;
   a combustion products discharge conduit that is disposed external to the tank and coupled to the combustion products transfer chamber structure such that the combustion products discharge conduit is in fluid communication with the combustion products transfer chamber structure, wherein an inlet end of the combustion products discharge conduit is disposed in and coupled to a sidewall of the combustion products transfer chamber structure while a remainder of the combustion products discharge conduit is disposed outside and spaced apart from the tank;
   a combustion chamber comprising a side wall and a bottom wall that defines an interior space, wherein the combustion chamber extends into an interior of the tank through the upper wall of the tank and towards the lower wall, wherein the combustion chamber is partially submerged in the interior of the tank such that an exterior surface of the bottom wall and an exterior surface of at least a portion of the side wall of the combustion chamber are in direct contact with the quantity of liquid in the tank, and wherein the combustion chamber terminates adjacent the upper wall of the tank;
   a single pass heat exchanger structure disposed in the interior of the tank and connecting the combustion chamber and the combustion products transfer chamber structure, wherein the single pass heat exchanger structure comprises an inlet end that is disposed in the combustion chamber to receive hot combustion products created by a fuel burner and an outlet end that is disposed and opens into the combustion products transfer chamber structure that is disposed outside and below the tank and that has the combustion products discharge conduit attached thereto to exhaust the hot combustion products; and
   the fuel burner is operative to create the hot combustion products within the interior space of the combustion chamber for transfer therefrom sequentially through the single pass heat exchanger structure, into the combustion products transfer chamber structure, and then outwardly from the combustion products chamber structure into the combustion products discharge conduit.

2. The fuel-fired liquid heating apparatus of claim 1 wherein:
   the apparatus is a fuel-fired water heater.

3. The fuel-fired liquid heating apparatus of claim 2 wherein:
   the water heater is a gas-fired water heater.

4. The fuel-fired liquid heating apparatus of claim 1 wherein the single pass heat exchanger structure comprises a plurality of flue pipes, and wherein the plurality of flue pipes have straight configurations and longitudinally extend parallel to a vertical axis extending through the tank.

5. The fuel-fired liquid heating apparatus of claim 1 wherein the single pass heat exchanger structure comprises a plurality of flue pipes, and the plurality of flue pipes spiral around a vertical axis extending through the tank.

6. The fuel-fired liquid heating apparatus of claim 1 wherein:
   the single pass heat exchanger structure is a condensing heat exchanger structure.

7. The fuel-fired liquid heating apparatus of claim 1 further comprising:
   a condensate drain fitting disposed on the combustion products discharge conduit.

8. The fuel-fired liquid heating apparatus of claim 1, wherein the single pass heat exchanger structure comprises a plurality of flue pipes, and wherein the inlet end of each of the plurality of flue pipes is connected to the bottom wall of the combustion chamber and the outlet end of each of the plurality of flue pipes is connected to the combustion products transfer chamber structure.

9. The fuel-fired liquid heating apparatus of claim 8:
   wherein the bottom wall of the combustion chamber has a plurality of apertures disposed within a perimeter of the bottom wall,
   wherein the plurality of apertures disposed in the bottom wall of the combustion chamber are configured to receive the inlet ends of each of the plurality of flue pipes therethrough,
   wherein each aperture of the plurality of apertures has a diameter that is smaller than a diameter of the bottom wall of the partially submerged combustion chamber, and
   wherein a diameter of each flue pipe of the plurality of flue pipes is smaller than the diameter of the bottom wall of the partially submerged combustion chamber.

10. The fuel-fired liquid heating apparatus of claim 1 wherein:
    the fuel burner extends downwardly into the interior space of the combustion chamber.

11. The fuel-fired liquid heating apparatus of claim 1 wherein:
    the fuel burner is a powered fuel burner operative to sequentially force the hot combustion products downwardly through the combustion chamber, downwardly through the single pass heat exchanger structure into the combustion products transfer chamber structure, and then outwardly from the combustion products chamber structure into the combustion products discharge conduit.

12. The fuel-fired liquid heating apparatus of claim 1 further comprising:
    an induced draft blower connected to the combustion products discharge conduit and operative to sequentially draw the hot combustion products downwardly through the combustion chamber, downwardly through the single pass heat exchanger structure into the combustion products transfer chamber structure, and then outwardly from the combustion products transfer chamber structure into and through the combustion products discharge conduit.

13. The fuel-fired liquid heating apparatus of claim 12 wherein:
the induced draft blower, during operation thereof, maintains a negative pressure in the combustion chamber and the combustion products transfer chamber structure.

14. A fuel-fired liquid heating apparatus comprising:
a tank adapted to hold a quantity of liquid to be heated, the tank having upper and lower ends;
a combustion products transfer chamber structure disposed outside and at the lower end of the tank such that the lower end of the tank defines a top wall of the combustion products transfer chamber structure;
a combustion products discharge conduit disposed externally of the tank and having an inlet end communicating directly with an interior of the combustion products transfer chamber structure, wherein an inlet end of the combustion products discharge conduit is disposed in and coupled to a sidewall of the combustion products transfer chamber structure while a remainder of the combustion products discharge conduit is disposed outside and spaced apart from the tank;
a combustion chamber extending downwardly into an interior of the tank through the upper end thereof,
wherein the combustion chamber is spaced upwardly and apart from the lower end of the tank,
wherein the combustion chamber has a bottom end wall, at least one side wall, and a top end that together define an interior space of the combustion chamber, the top end being disposed at substantially the same elevation as the upper end of the tank, and
wherein the combustion chamber is disposed in the interior of the tank such that an exterior surface of the bottom end wall and an exterior surface of at least a portion of the at least one side wall of the combustion chamber are in direct contact with the quantity of liquid to be heated; and
a plurality of flue pipes connecting the combustion chamber and the combustion products transfer chamber structure,
wherein each of the plurality of flue pipes comprises an inlet end that is disposed in the combustion chamber to receive hot combustion products created by a fuel burner and an outlet end that is disposed in and opens into the combustion products transfer chamber structure that is disposed outside and at the lower end of the tank and that has the combustion products discharge conduit attached thereto to exhaust the hot combustion products
wherein the fuel-fired liquid heating apparatus is operable to heat the quantity of liquid in the tank by sequentially transferring the hot combustion products that are created in the combustion chamber into the combustion products transfer chamber structure through the plurality of flue pipes, and then outwardly from the combustion products chamber structure through the combustion products discharge conduit.

15. The fuel-fired liquid heating apparatus of claim 14, further comprising:
the fuel burner disposed at the top end of the combustion chamber and extending downwardly into the interior space of the combustion chamber, wherein the fuel burner comprises air and fuel inlets, and wherein the fuel burner being operative to create the hot combustion products within the interior space of the combustion chamber.

16. The fuel-fired liquid heating apparatus of claim 14 wherein:
the apparatus is a fuel-fired water heater.

17. The fuel-fired liquid heating apparatus of claim 14 wherein:
the plurality of flue pipes have straight configurations and longitudinally extend parallel to a vertical axis extending through the tank.

18. The fuel-fired liquid heating apparatus of claim 14 wherein:
the plurality of flue pipes spiral around a vertical axis extending through the tank.

19. The fuel-fired liquid heating apparatus of claim 14 wherein:
the inlet end of each of the plurality of flue pipes is connected directly to the bottom end wall of the combustion chamber and the outlet end is connected directly to the combustion products transfer chamber structure, and wherein the plurality of flue pipes operate as a condensing heat exchanger structure.

20. The fuel-fired liquid heating apparatus of claim 14, further comprising:
a condensate drain fitting disposed on the combustion products discharge conduit at a location adjacent a bottom of a vertically extending portion of the combustion products discharge conduit at a location laterally displaced from the tank.

* * * * *